US010551715B2

(12) United States Patent
Saeedi et al.

(10) Patent No.: US 10,551,715 B2
(45) Date of Patent: Feb. 4, 2020

(54) OPTICAL RING MODULATOR THERMAL TUNING TECHNIQUE

(71) Applicant: California Institute of Technology, Pasadena, CA (US)

(72) Inventors: Saman Saeedi, Pasadena, CA (US); Azita Emami, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 0 days.

(21) Appl. No.: 15/162,163

(22) Filed: May 23, 2016

(65) Prior Publication Data
US 2017/0131613 A1 May 11, 2017

Related U.S. Application Data

(60) Provisional application No. 62/165,410, filed on May 22, 2015.

(51) Int. Cl.
G02F 1/225 (2006.01)
G02B 6/122 (2006.01)
(Continued)

(52) U.S. Cl.
CPC ............ G02F 1/2257 (2013.01); G02B 6/122 (2013.01); G02B 2006/12159 (2013.01); G02F 2001/212 (2013.01); G02F 2201/06 (2013.01)

(58) Field of Classification Search
CPC .. G02F 1/2257; G02F 2001/212; G02B 6/122
See application file for complete search history.

(56) References Cited

U.S. PATENT DOCUMENTS 5,867,990 A 2/1999 Ghoshal
5,929,430 A 7/1999 Yao et al.
(Continued)

FOREIGN PATENT DOCUMENTS

JP 06-129916 A 5/1994
JP 07270632 A 10/1995
(Continued)

OTHER PUBLICATIONS

PCT International Search Report and Written Opinion of the International Searching Authority for application PCT/US2016/022504 dated Jun. 21, 2016.
(Continued)

Primary Examiner — Sung H Pak
Assistant Examiner — Hoang Q Tran
(74) Attorney, Agent, or Firm — Alston & Bird LLP

(57) ABSTRACT

An optical signal modulator (modulator) includes, in part, a first multitude of diodes coupled in parallel and disposed along an outer periphery of the optical ring of the modulator, a second multitude of diodes coupled in parallel and disposed along the outer periphery of the optical ring, and a doped region adapted to supply heat to the optical ring. A pair of current sources supply substantially constant currents to the first and second multitude of diodes to generate a pair of electrical signals. The modulator further includes, in part, a control circuit adapted to control the temperature of the optical ring in accordance with the pair electrical signals. To achieve this, the control circuit varies the voltage applied to the doped region to vary the supplied heat. Alternatively, the control circuit applies a voltage to the optical ring to maintain a substantially constant resonant wavelength in the optical ring.

20 Claims, 6 Drawing Sheets

(51) Int. Cl.
  *G02B 6/12* (2006.01)
  *G02F 1/21* (2006.01)

(56) References Cited

U.S. PATENT DOCUMENTS

| | | |
|---|---|---|
| 6,330,098 B1 | 12/2001 | Gopalakrishnan |
| 6,430,936 B1 | 8/2002 | Ghoshal |
| 6,449,080 B1 | 9/2002 | McBrien et al. |
| 6,493,127 B2 | 12/2002 | Gopalakrishnan |
| 6,665,105 B2 | 12/2003 | Wipiejewski |
| 6,766,083 B2 | 7/2004 | Bona et al. |
| 6,795,626 B2 | 9/2004 | Shahar et al. |
| 6,892,016 B2 | 5/2005 | Shahar et al. |
| 7,161,726 B2 | 1/2007 | Bintz |
| 7,259,901 B2 | 8/2007 | Parsons et al. |
| 7,715,663 B2 | 5/2010 | Carothers |
| 7,848,601 B2 | 12/2010 | Carothers |
| 8,032,027 B2 | 10/2011 | Popovic |
| 8,054,669 B2 | 11/2011 | Meijer et al. |
| 8,111,730 B2 | 2/2012 | Budd et al. |
| 8,111,994 B2 | 2/2012 | Popovic |
| 8,299,608 B2 | 10/2012 | Bartley et al. |
| 8,411,719 B2 | 4/2013 | Budd et al. |
| 8,483,253 B2 | 7/2013 | Budd et al. |
| 8,483,521 B2 | 7/2013 | Popovic |
| 8,582,937 B2 | 11/2013 | Xu |
| 8,610,994 B1 | 12/2013 | Lentine et al. |
| 8,655,114 B2 | 2/2014 | Popovic |
| 8,824,036 B2 | 9/2014 | Manipatruni et al. |
| 8,912,017 B2 | 12/2014 | El-Ghoroury et al. |
| 9,036,737 B2 | 5/2015 | Nilsson et al. |
| 9,134,169 B2 | 9/2015 | Li et al. |
| 9,239,477 B2 | 1/2016 | Jiang |
| 2002/0089733 A1 | 7/2002 | Gopalakrishnan |
| 2002/0092307 A1 | 7/2002 | Ghoshal |
| 2002/0166839 A1 | 11/2002 | Ghoshal et al. |
| 2003/0025976 A1 | 2/2003 | Wipiejewski |
| 2003/0142928 A1 | 7/2003 | Hirata et al. |
| 2004/0037524 A1 | 2/2004 | Shahar et al. |
| 2004/0037525 A1 | 2/2004 | Shahar et al. |
| 2004/0223677 A1 | 11/2004 | Park et al. |
| 2005/0275921 A1 | 12/2005 | Haus et al. |
| 2006/0056845 A1 | 3/2006 | Parsons et al. |
| 2006/0098910 A1 | 5/2006 | Bintz et al. |
| 2008/0044184 A1 | 2/2008 | Popovic |
| 2008/0181332 A1 | 7/2008 | Tian et al. |
| 2008/0295879 A1 | 12/2008 | Atanackovic |
| 2009/0092350 A1 | 4/2009 | Gill |
| 2009/0277608 A1 | 11/2009 | Kamins et al. |
| 2010/0039848 A1 | 2/2010 | Meijer et al. |
| 2010/0053712 A1 | 3/2010 | Carothers |
| 2010/0157402 A1 | 6/2010 | Carothers |
| 2010/0158429 A1 | 6/2010 | Popovic |
| 2010/0209038 A1 | 8/2010 | Popovic |
| 2010/0303122 A1 | 12/2010 | Popovic |
| 2010/0322569 A1 | 12/2010 | Ohyama et al. |
| 2011/0044367 A1 | 2/2011 | Budd et al. |
| 2011/0058765 A1 | 3/2011 | Xu |
| 2011/0235962 A1 | 9/2011 | Shubin et al. |
| 2012/0007229 A1 | 1/2012 | Bartley et al. |
| 2012/0057866 A1 | 3/2012 | McLaren et al. |
| 2012/0062974 A1 | 3/2012 | Manipatruni et al. |
| 2012/0087659 A1 | 4/2012 | Gill |
| 2012/0120976 A1 | 5/2012 | Budd et al. |
| 2012/0120978 A1 | 5/2012 | Budd et al. |
| 2012/0155888 A1 | 6/2012 | Ji et al. |
| 2012/0243828 A1 | 9/2012 | Suzuki |
| 2012/0288995 A1 | 11/2012 | El-Ghoroury et al. |
| 2013/0044973 A1 | 2/2013 | Akiyama |
| 2013/0121631 A1 | 5/2013 | Yu et al. |
| 2013/0223793 A1 | 8/2013 | Kim |
| 2014/0023309 A1 | 1/2014 | Jiang |
| 2014/0110572 A1 | 4/2014 | Li et al. |
| 2014/0376662 A1 | 12/2014 | Nilsson et al. |
| 2015/0029569 A1 | 1/2015 | Smith et al. |
| 2016/0124251 A1* | 5/2016 | Zhang ............... G02B 6/1225 385/8 |
| 2016/0156999 A1 | 6/2016 | Liboiron-Ladouceur et al. |
| 2016/0306201 A1 | 10/2016 | Saeedi et al. |

FOREIGN PATENT DOCUMENTS

| | | |
|---|---|---|
| JP | 2010-092904 A | 4/2010 |
| JP | 5455955 B2 | 3/2014 |
| JP | 2014-211550 A | 11/2014 |
| WO | WO 2016/149289 A1 | 9/2016 |
| WO | WO 2016/191386 A1 | 12/2016 |

OTHER PUBLICATIONS

PCT International Search Report and Written Opinion of the International Searching Authority for application PCT/US2016/033813 dated Aug. 29, 2016.

Sasher et al., "Binary phase-shift keying by coupling modulation of microrings," Optics Express, 22(17):20252-20259, (2014).

U.S. Appl. No. 15/070,665, Final Office Action dated Mar. 21, 2018.

California Institute of Technology, Mixed-mode Integrated Circuits and Systems (MICS) Selected Publications, 4 pages. [Retrieved from the Internet Apr. 16, 2017: <URL:http://www.mics.caltech.edu/publications/index.php].

Novack, et al., "A 30 GHz Silicon Photonic Platform," SPIE Optics + Optoelectronics, International Society Optics and Photonics, (2013).

Popovic, "Theory and Design of High-Index-Contrast Microphotonic Circuits," Dissertation, Massachusetts Institute of Technology, (2008). [Retrieved from the Internet Jan. 11, 2018: <URL: http://plab.colorado.edu/CVs/popovic-phd-eecs-2008.pdf>].

Sacher, et al., "Binary phase-shift keying by coupling modulation of microrings," Optics Express, 22(17):20252-20259, (2014).

Sacher, et al., "Coupling modulation of microrings at rates beyond the linewidth limit," Optics Express, 21(8):9722-9733, (2013).

Sacher, et al., "Dynamics of microring resonator modulators," Optics Express, 16(20):15741-15753, (2008).

Shtaif, et al., "Carrier-envelope phase locking of multi-pulse lasers with intra-cavity Mach-Zehnder interferometer," Optics Express, 19(23):23202-23214, (2011).

Xu, et al., "Micrometre-scale silicon electro-optic modulator," Nature, 435(7040):325-327, (2005).

PCT International Preliminary Report on Patentability for application PCT/US2016/022504 dated Sep. 19, 2017.

PCT International Preliminary Report on Patentability for application PCT/US2016/033813 dated Nov. 28, 2017.

U.S. Appl. No. 15/070,665, Non-Final Office Action dated May 18, 2017.

U.S. Appl. No. 15/070,665, Requirement for Restriction/Election dated Dec. 21, 2016.

U.S. Appl. No. 15/070,665, Response to Non-Final Office Action filed Nov. 20, 2017.

Atabaki et al., "Tuning of resonance-spacing in a traveling-wave resonator device," Optics Express, 18(9):9447-9455, (2010).

Green et al., "Optical modulation using anti-crossing between paired amplitude and phase resonators," Optics Express, 15(25):17264-17272, (2007).

Li et al., "Silicon microring carrier-injection-based modulators/switches with tunable extinction ratios and OR-logic switching by using waveguide cross-coupling," Optics Express, 15(8):5069-5076, (2007).

Martinez-Llinas et al., "Tuning the period of square-wave oscillations for delay-coupled optoelectronic systems," Physical Review E, 89:11 pages, (2014).

U.S. Appl. No. 15/070,665, Non-Final Office Action dated Dec. 13, 2018.

U.S. Appl. No. 15/070,665, Response to Final Office Action filed Sep. 20, 2018.

(56) References Cited

OTHER PUBLICATIONS

U.S. Appl. No. 15/070,665, Notice of Allowance dated Aug. 26, 2019.

* cited by examiner

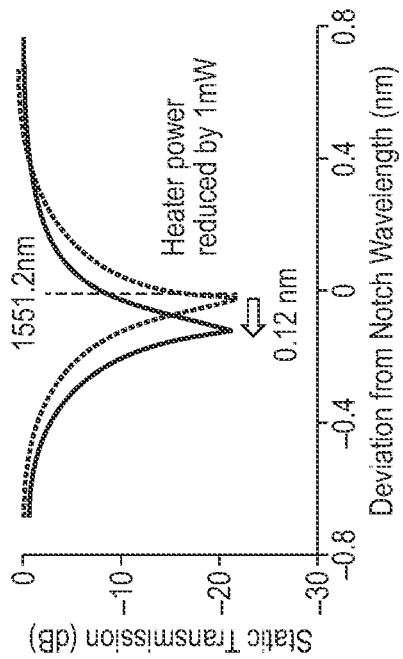
FIG. 5A
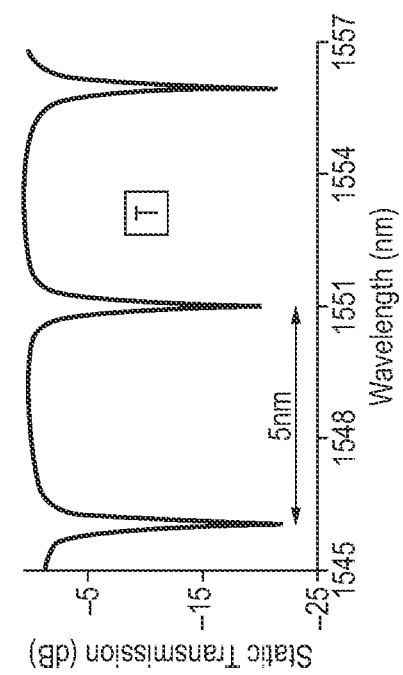
FIG. 5C
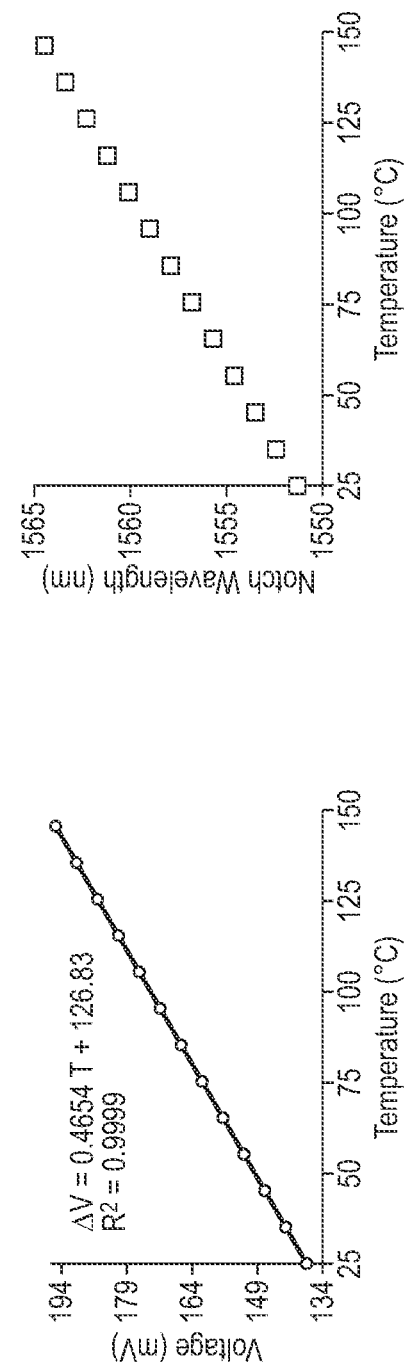
FIG. 5B
FIG. 5D

OPTICAL RING MODULATOR THERMAL TUNING TECHNIQUE

CROSS REFERENCE TO RELATED APPLICATIONS

The present application claims benefit under 35 USC 119 (e) of U.S. provisional Application No. 62/165,410, filed May 22, 2015, entitled "Optical Ring Modulator Thermal Tuning Technique", the content of which is incorporated herein by reference in its entirety.

FIELD OF THE INVENTION

The present invention relates to optoelectronic devices, and more particularly to optical ring modulators.

BACKGROUND OF THE INVENTION

Electro-optic modulators (EOM) are commonly used in optical communication networks. A phase-modulating EOM may be used in a Mach-Zehnder interferometer to modulate the amplitude of an incoming optical signal. As is known, Mach-Zehnder based opto-electronic modulators have a relatively high power consumption, are large and require a high drive voltage.

Improving the bandwidth-density product in an integrated silicon photonic system requires a corresponding improvement in the performance of the optical modulator disposed in such a system. Optical modulation in conventional optical ring modulators is achieved either by varying the coupling level or by changing the index of refraction of the ring, either by injecting excess minority carriers in the associated PIN junction or by changing the reverse bias voltage applied to the PN junction. The change in the index of refraction causes a change in the optical path length of the ring, in turn changing the resonance frequency of the ring.

Conventional optical ring modulators are susceptible to thermal fluctuations. As the Q of the ring increases, which is desirable for lower power consumption, sensitivity to thermal fluctuations also increases. Thermal fluctuations of an optical ring modulator may be caused by ambient thermal noise as well as data-dependent self-heating of the device. An optical ring modulator (referred to alternatively herein as modulator) absorbs incoming light differently for 1's and 0's, thus causing the temperature of the modulator to depend on the incoming data pattern.

On-chip resistive heaters are conventionally used to compensate ambient thermal fluctuations and data-dependent self-heating. In order to reduce the required power for thermal tuning of the ring modulator, the heat capacity of the device may be decreased. One way to achieve that is by under-etching the photonic IC's substrate.

For the same amount of absorbed heat, the lower the heat capacity of the modulator, the higher is the temperature fluctuations. Therefore, reducing the heat capacity exacerbates data-dependent self-heating. Data-dependent self-heating requires relatively fast thermal tuning which is difficult to achieve with resistive heaters.

BRIEF SUMMARY OF THE INVENTION

An optical signal modulator, in accordance with one embodiment of the present invention, includes, in part, a waveguide receiving an optical signal, an optical ring adapted to receive a portion of the optical signal via optical coupling, a first multitude of diodes coupled in parallel and disposed along an outer periphery of the optical ring, said first plurality of diodes generating a first electrical signal, a second multitude of diodes coupled in parallel and disposed along the outer periphery of the optical ring, and a doped region adapted to generate heat to the optical ring. The first multitude of diodes generate a first electrical signal, and the second multitude of diodes generate a second electrical signal. The optical signal modulator, further includes, in part a control circuit adapted to control a temperature of the optical ring in accordance with the first and second electrical signals.

In one embodiment, each of the first multitude of diodes has the same junction area. In one embodiment, each of the second multitude of diodes has the same junction larger than the junction area of the first multitude of diodes.

In one embodiment, each of at least a first subset of the first multitude of diodes is disposed between a pair of the second multitude of diodes. In one embodiment, the optical signal modulator, includes, in part, a first current source supplying a substantially constant first current to the first multitude of diodes to generate the first electrical signal; and a second current source supplying a substantially constant second current to the second multitude of diodes to generate the second electrical signal.

In one embodiment, the control circuit includes, in part, an amplifier adapted to control the temperature of the optical ring in accordance with the first and second electrical signals. In one embodiment, in response to the first and second electrical signals, the amplifier applies a voltage to the doped region to vary the heat it supplies so as to maintain the temperature of the ring within a predefined range. In another embodiment, in response to the first and electrical signals, the amplifier applies a DC voltage to the optical ring to maintain a substantially constant resonant wavelength in the optical ring. In one embodiment, the optical signal modulator is integrated in a semiconductor substrate. In one embodiment, the substrate is a silicon substrate.

A method of modulating an optical signal, in accordance with one embodiment of the present invention, includes, in part, supplying an optical signal to a waveguide, coupling a portion of the optical signal to an optical ring, generating a first electrical signal via a first multitude of diodes coupled in parallel and disposed along an outer periphery of the optical ring, generating a second electrical signal via a second multitude of diodes coupled in parallel and disposed along the outer periphery of the optical ring, supplying heat to the optical ring via a doped region formed near a portion of the optical ring, and controlling the temperature of the optical ring in accordance with the first and second electrical signals.

In one embodiment, each of the first multitude of diodes has the same junction area. In one embodiment, each of the second multitude of diodes has the same junction area larger than the junction area of the first multitude of diodes. In one embodiment, each of at least a first subset of the first multitude of diodes is disposed between a pair of the second multitude of diodes.

The method of modulating an optical signal, in accordance with one embodiment of the present invention, further includes, in part, supplying a substantially constant first current to the first multitude of diodes to generate the first electrical signal; and supplying a substantially constant second current to the second multitude of diodes to generate the second electrical signal.

In one embodiment, the method further includes, in part, amplifying the difference between the first and second electrical signals to generate an amplified signal. In one embodiment, the method further includes, in part, controlling the heat supplied to the optical ring in accordance with the amplified signal. In one embodiment, the method further includes, in part, controlling a DC voltage applied the optical ring in accordance with the amplified signal to maintain a substantially constant resonant wavelength in the optical ring.

In one embodiment, the waveguide, optical ring, doped region, first and second plurality of diodes, and the first and second current sources supplying the first and second currents are integrated in a semiconductor substrate. In one embodiment, the substrate is a silicon substrate.

BRIEF DESCRIPTION OF THE DRAWINGS

FIG. 5A is a plot of the static transmission characteristic of the optical ring modulator of FIG. 4A in dB as a function of the light travelling through the optical ring modulator FIG. 5B is a plot of the static transmission characteristic of the optical ring modulator of FIG. 4A as a function of the deviation from the notch wavelength of the optical ring modulator.

FIG. 5C shows the difference between the voltage of the sensing diodes with relatively larger junction areas and the voltage of the sensing diodes with relatively smaller junction areas as a function of the measured temperature applied to the optical ring modulator of FIG. 4A.

FIG. 5D shows the notch wavelength of the light in the optical ring modulator of FIG. 4A as a function of the sensed temperature of the ring modulator.

DETAILED DESCRIPTION OF THE INVENTION

In accordance with embodiments of the present invention, the temperature of an optical modulator is controlled via a feedback or feedforward loop that senses the temperature of the optical modulator.

Figure 1:
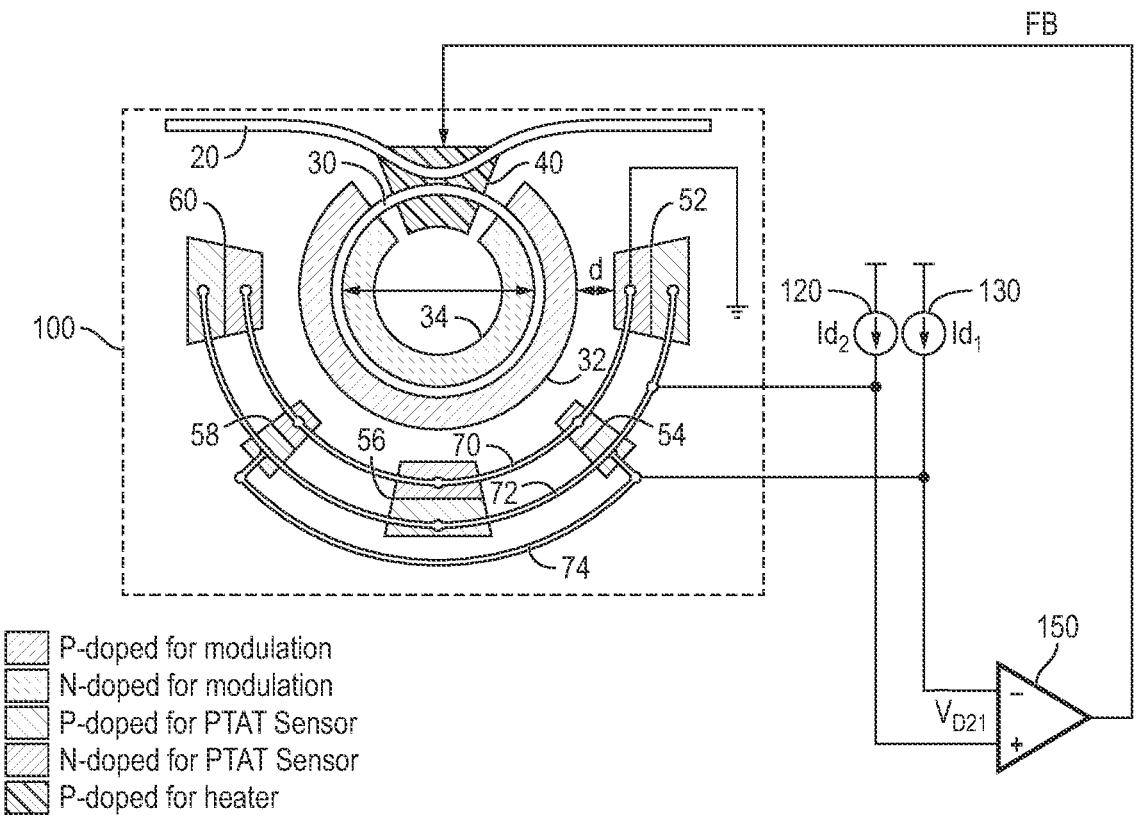
FIG. 1 is a simplified schematic top layout view of an integrated optical modulator, in accordance with one exemplary embodiment of the present invention.

FIG. 1 is a simplified schematic top layout view of an integrated optical modulator 100, in accordance with one exemplary embodiment of the present invention. Integrated optical modulator 100 is shown as including, in part, a waveguide 20, and an optical ring 30. The optical signal traveling through waveguide 20 is coupled to optical ring 30.

Exemplary integrated optical ring modulator (hereinafter alternatively referred to as modulator) 30 is shown as further including, in part, p-doped region 32 and n-doped region 34 positioned along the inner periphery and outer periphery of ring 30 respectively. Modulator 30 is also shown as including a p-doped region 40 formed below the area where waveguide 20 is bent to enable the coupling of the light between waveguide 20 and ring 30 to take place.

Positioned away from the outer periphery of p-region 32 are a multitude of integrated p-n diodes. Exemplary embodiment of 30 is shown as including five such diodes 52, 54, 56, 58, 60. It is understood that other embodiments of a modulator, in accordance with the present invention, may have more or fewer such diodes. The cathode terminals (n-doped regions) of diodes 52, 54, 56, 58 and 60 are shown as being coupled to the ground terminal via metal trace 70. The cathode terminals (p-doped regions) of diodes 52, 56 and 60 are shown as being coupled to one another via metal trace 72. The cathode terminals of diodes 54 and 58 are shown as being coupled to one another via metal trace 74. In one embodiment, metal traces 70 and 74 are formed using, for example, a first metal layer of a semiconductor process; and metal trace 72 is formed using, for example, a second metal layer of the semiconductor process. Each of diodes 52, 56 and 60 has a junction area and hence a saturation current that is N times the saturation current of diodes 54 and 58, where N is an integer or a non-integer number.

A control circuit adapted to maintain the temperature of modulator 100 via a feedback loop is also integrated with modulator 100. In FIG. 1, the control circuit is shown as including current sources 120, 130 and amplifier 150. Current source 120 is adapted to supply a substantially constant current $I_{D2}$ to diodes 52, 56, and 60. Current source 130 is shown as supplying a substantially constant current $I_{D1}$ to diodes 54, and 58. Current sources $I_{D1}$ and $I_{D2}$ are also coupled to the input terminals of amplifier 150, as shown.

Currents $I_{D1}$ and $I_{D2}$ forward bias the diodes they are delivered to. As is known, the voltage $V_d$ across a p-n diode is related to the current $I_d$ flowing through the diode according to the following equation:

$$V_d = \frac{nKT}{q} ln\left(\frac{I_d}{I_s}\right) \qquad (1)$$

where K is the Boltzmann constant, T is the temperature in Kelvin, q is the electron charge, $I_s$ is the reverse bias saturation current and n is a fabrication constant typically having a value between 1 and 2.

Because substantially no current flows through the input terminals of amplifier 150, voltage $V_{D21}$ developed across the input terminals of amplifier 150 may be defined as following:

$$V_{D21} = (V_{D2} - V_{D2}) = \frac{nKT}{q}\left(n\left(\frac{I_{D2}}{I_{S2}}\right) - ln\left(\frac{I_{D1}}{I_{S1}}\right)\right) = \frac{nKT}{q} ln\left(N\frac{I_{D2}}{I_{D1}}\right) \qquad (2)$$

where $V_{D2}$ is the voltage across any of the diodes 52, 56, 60, $V_{D1}$ is the voltage across any of the diodes 54, 58, $I_{S2}$ is the saturation current of any of the diodes 52, 56, 60, and $I_{S1}$ is the saturation current of any of the diodes 56 and 60.

As is seen from equation (2), the voltage difference $V_{D21}$ across the two input terminals of amplifier 150 is directly proportional to the temperature of the diodes and hence to the temperature of ring 30. As is also seen from this equation, the rate of change of $V_{D21}$ is dependent, in part, directly on parameter N as well as the ratio of currents $I_{D2}$ and $I_{D1}$.

Parameter N is selected to achieve a number of competing objectives. For a given voltage sensitivity, it is desirable to maximize the rate of change of $V_{D21}$ to achieve a greater accuracy in temperature readings. However, if the ratio of currents $I_{D2}$ and $I_{D1}$ is relatively large, the difference between the voltage drops across the parasitic resistances of the diodes may result in error. A low-pass filter (not shown) may be used to reduce the effect of such parasitics but such a filter may also limit the bandwidth of the feedback loop. Therefore, in high-speed applications with a limited power budget, currents $I_{D2}$ and $I_{D1}$ are selected to satisfy the noise requirements. In one embodiment, the ratio of currents $I_{D2}$ and $I_{D1}$ is selected to be nearly equal to 4, and N is selected to be nearly equal to 5.

To accurately sense ring 30's temperature, in accordance with embodiments of the present invention, diodes 52, 54, 56, 58 and 60 are formed in close proximity of the ring 30. Heater 40 is also formed in close proximity to a section of the ring so as to allocate a major section of the perimeter of the ring for signal modulation. The distance between d diodes 52, 54, 56, 58 and 60 and ring 30 is selected so as to inhibit the leakage current between the p-doped region 32 of ring 30 and n-doped regions of temperature sensing diodes 52, 54, 56, 58 and 60. In one exemplary embodiment, distance d is selected to be 8 µm to ensure no leakage.

Figure 2:
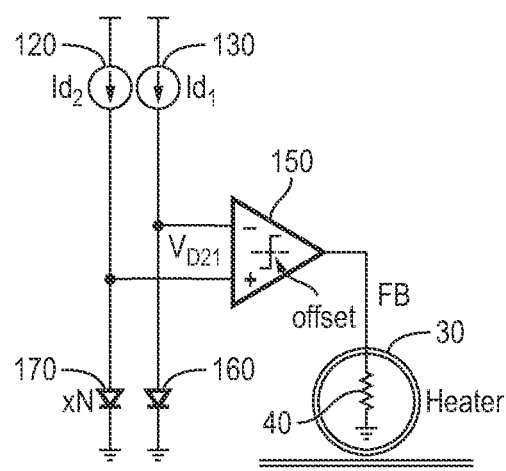
FIG. 2 is a simplified schematic block diagram of a number of components of the optical modulator shown in FIG. 1.

FIG. 2 is a simplified schematic block diagram of modulator 30, heater 40, amplifier 150, current sources 120, 130 and temperature sensing diodes shown in FIG. 1. In FIG. 2, diodes 54 and 58 are collectively shown as diode 160, and diodes 52, 56 and 60 are collectively shown as diode 170. As is seen from FIG. 2, diodes 160 and 170 are used as temperature sensing diodes in a feedback loop to stabilize the temperature of modulator ring 30 via feedback signal FB applied to heater 40.

The feedback is controlled by directly sensing the temperature of the ring and applying a voltage to heater proportional to temperature error. Temperature error is defined herein as the difference between a target temperature and ring's temperature. Accordingly, as the temperature of the ring (and hence the temperature of diodes 160 and 170) increases, voltage $V_{D21}$ also increases, thereby causing the voltage applied to heater 40 to decrease. Conversely, as the temperature of the ring decreases, voltage $V_{D21}$ also increases, thereby causing the voltage applied to heater 40 to increase.

Amplifier 150 may be a programmable gain amplifier (PGA) or an ADC-based controller to maintain a constant temperature. The target temperature may be set by the offset introduced in PGA or ADC. Current sources 120 and 130 are substantially temperature independent and may be implemented using bandgap current sources and positioned away from the ring.

Figure 3:
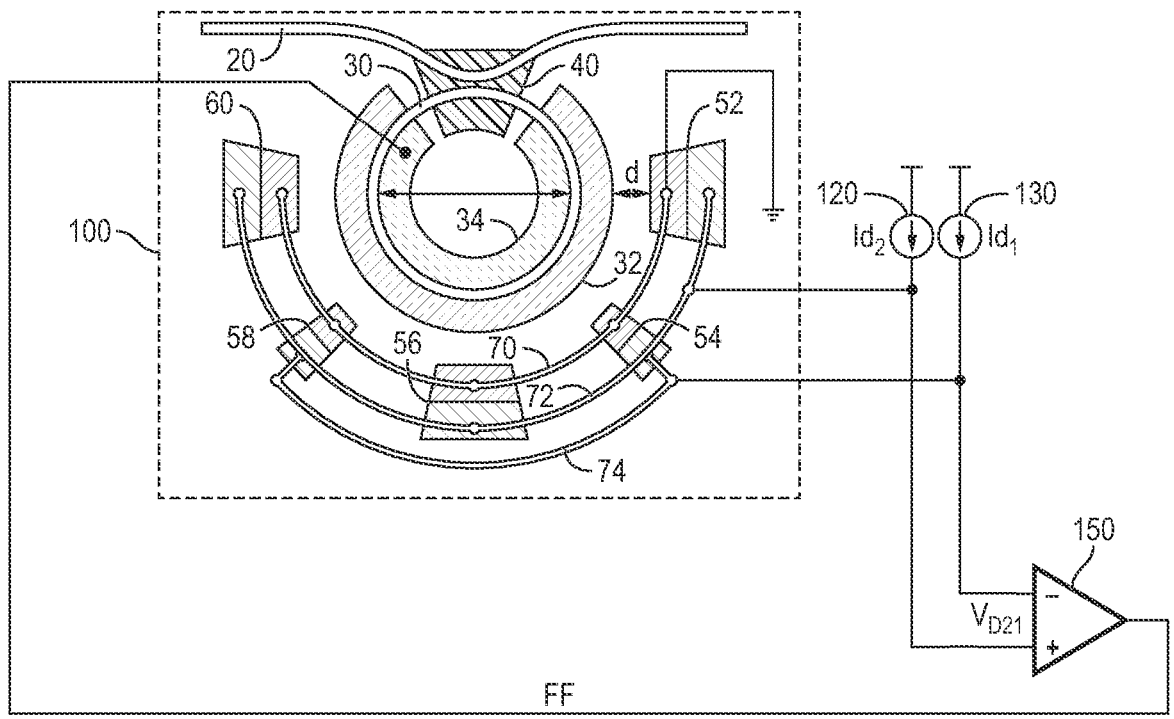
FIG. 3 is a simplified top schematic view of an integrated optical modulator, in accordance with another exemplary embodiment of the present invention.

FIG. 3 is a simplified top schematic view of an integrated optical modulator 300, in accordance with another exemplary embodiment of the present invention. Integrated optical modulator 300 is similar to integrated optical modulator 100 shown in FIG. 1, except that in integrated optical modulator 300, feedforward control signal FF is applied to the n-doped region 34 of ring 30 to control the signal modulation. In this embodiment the output voltage of the temperature sensing diodes controls the DC bias of the modulator. The feedforward loop maintains a substantially constant resonance wavelength for the modulator despite temperature variations.

Figure 4A:
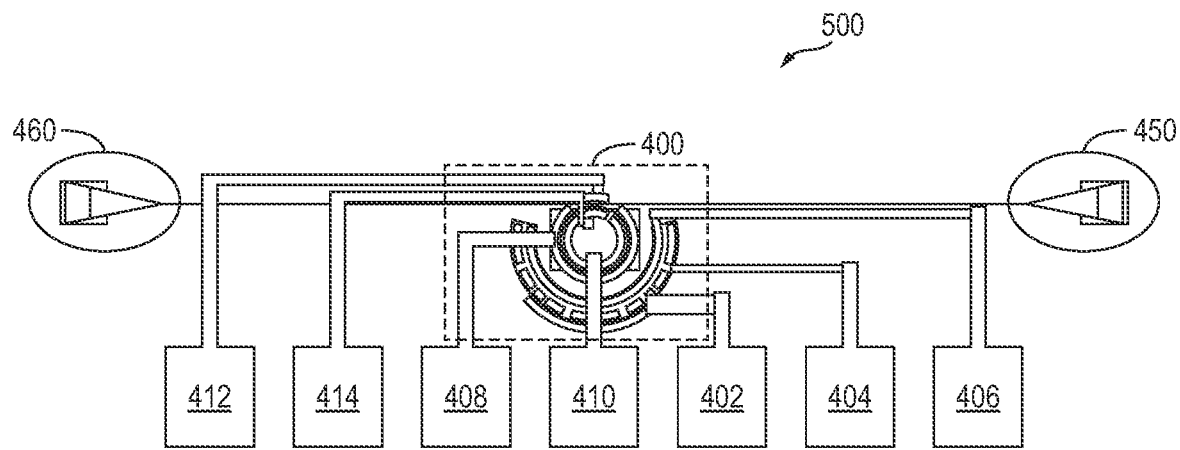
FIG. 4A is a top layout view of an exemplary optical ring modulator with an integrated heater and sending diodes, in accordance with one embodiment of the present invention.

FIG. 4A is a top layout view of an exemplary optical ring modulator 500 with an integrated heater and sending diodes, in accordance with one embodiment of the present invention. The ring modulator, the heater and the sensing diodes are disposed within region 400. Pads 402, 404 and 406 are coupled to the temperature sensing diodes via, for example, metal traces 70, 72, and 74 as shown in FIG. 1. Pads 408, 410 are coupled to the p-doped and n-doped regions of the ring modulator for DC as well AC biasing of the ring modulator. Pads 412 and 414 are used for biasing the heater using a feedback control signal as shown, for example, in FIG. 1. Grating couplers 450 and 460 are used for delivering optical signal to and receiving the optical signal from the ring modulator.

Figure 4B:
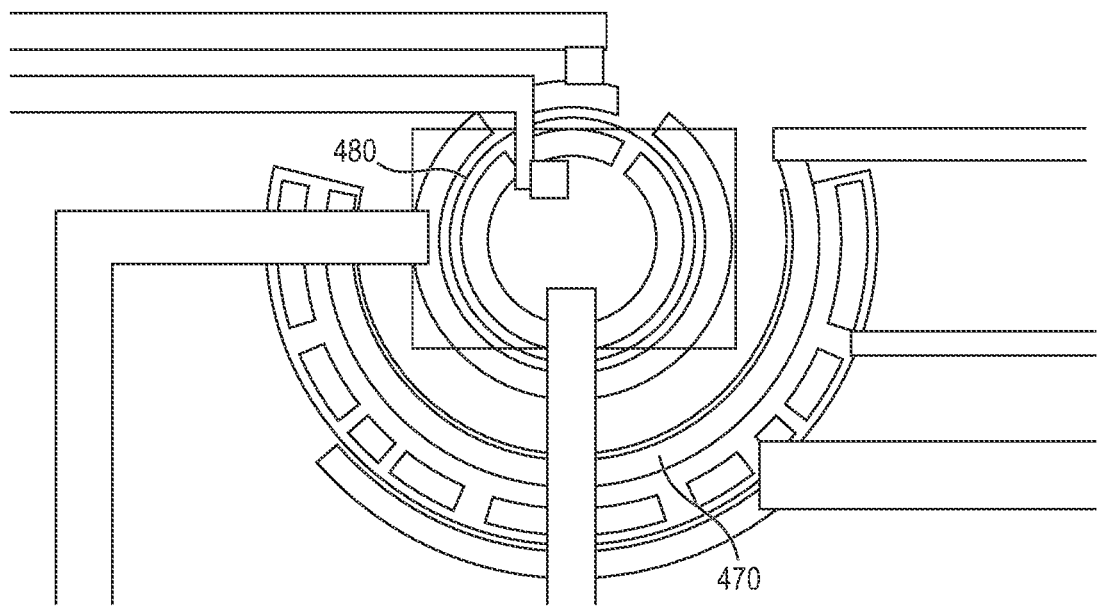
FIG. 4B is an expanded view of a region of the optical ring modulator shown in FIG. 4A.

FIG. 4B is an expanded view of region 400 of FIG. 4A showing ring 480 of the optical ring modulator as well as circular region 470 along which the sensing diodes (e.g., sensing diodes 52, 54, 56, 58, 60 of FIG. 1) are formed. Circular region is seen as positioned along outer periphery of ring 480 so that the sensing diode junctions follow the contours of the ring.

The DC and AC characteristics of the optical ring modulator 500 are shown in FIGS. 5A-5D. FIG. 5A is a plot of the static transmission characteristic of the ring in dB as a function of the light travelling through the ring. As shown in FIG. 5A, the full-width half-maximum of the transmission spectra is measured to be 0.33 nm, thus resulting in a Q of nearly 4700. The free spectral range (FSR) of the modulator is nearly 5 nm. FIG. 5B is a plot of the static transmission characteristic of the modulator as a function of the deviation from the notch wavelength of the modulator. As is seen from FIG. 5B, the tunability of the modulator is measured to be 0.12 nm/mW in this example.

FIG. 5C shows the difference (e.g., voltage $V_{D21}$ of FIG. 1) between the voltage across the sensing diodes with relatively larger junction areas (e.g., diodes 52, 56, 60 of FIG. 1) and the voltage across the sensing diodes with relatively smaller junction areas (e.g., diodes 54, 58 of FIG. 1) as a function of the measured temperature applied to the modulator. The relatively larger sensing diodes have a junction area that is 5 times larger than the junction area of the smaller diodes. The saturation currents of the smaller and larger diodes are measured to be $2 \times 10^{-18}$ A and $10^{-17}$ A respectively. Assuming that the DC currents of 2.5 µA and 10 µA are supplied to the smaller and larger sensing diodes respectively, the total power dissipated in the sensing diodes is approximately 9 µW. Consequently, the power dissipation of the sensing diodes is maintained at relatively low value.

The residual contacts, vias and wirebond resistances are estimated to be less than 45Ω for the diodes. To minimize the voltage drops across such resistances (i.e. error in the temperature reading of the sensing diodes), the diode currents are kept relatively low. The larger and smaller diodes have saturation currents of $2 \times 10^{-18}$ A and $10^{-17}$ A respectively. FIG. 5D shows the notch wavelength of the light in the ring modulator as a function of the sensed temperature of the ring modulator.

Figure 6:
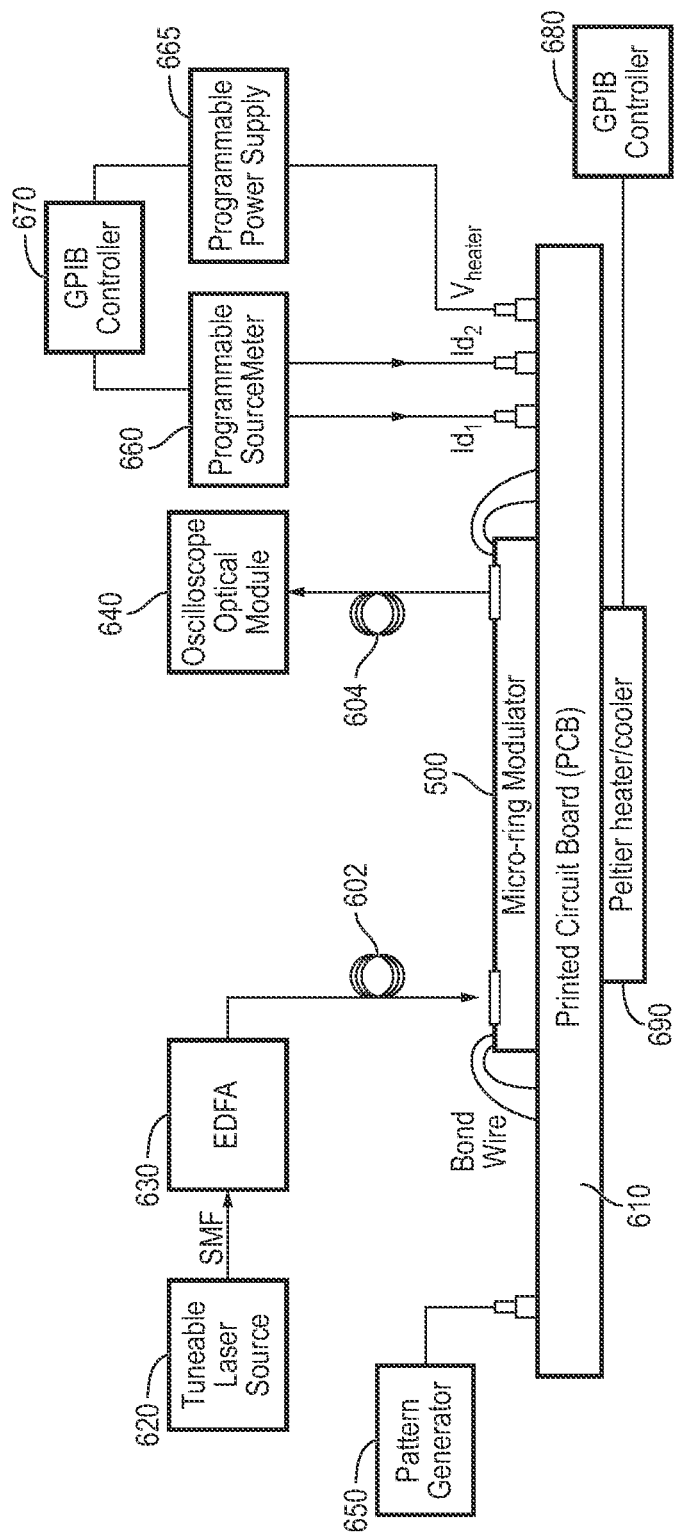
FIG. 6 shows a measurement setup used to measure the performance characteristics of the optical modulator shown in FIG. 4A.

FIG. 6 shows a measurement setup used to measure the performance characteristics of optical modulator 500 shown in FIG. 4A. The current through the heaters is controlled using heater control unit 660. Optical modulator ring 500 is shown as being wire-bonded to PCB 610 that carries high-speed and DC signals. A tunable laser source 620, an Erbium doped fiber amplifier (EDFA) 630, and gating coupler 602 are used to deliver an input optical signal to optical modulator 500. The output signal of the optical modulator ring is delivered to optical scope 640 via grating coupler 604. The high-speed data signals are delivered using a pattern generator 650.

Peltier thermoelectric heater/cooler 690 is used to emulate temperature fluctuations of the ring. The peltier heater/cooler provides a maximum temperature difference of 47° C. from a maximum current of 5A. The peltier cooler's current is modulated with a 0.5 Hz square wave such that the temperature of the optical modulator ring may change by nearly 3.2° C. every second in this example.

The feedback loop (or feedforward) that senses the temperature of the optical modulator ring and in response varies the voltage applied to the heater, or the optical ring modulator (as shown, for example, in FIGS. 1 and 3) or both is formed using a general purpose interface bus (GPIB) controller 670 controlling programmable current source 660 that supplies currents $I_{d1}$ and $I_{d2}$ to the temperature sensing diodes, and a programmable voltage supply 665 that supplies voltage to the heater integrated within optical ring modulator 500. The heater, which in this specific embodiment, includes a P-doped region formed under the coupling area of the optical ring modulator, has a resistance of 2 KΩ.

In the setup shown in FIG. 6, current sources are programmed to generate currents $I_{D1}$ and $I_{D2}$ of 2.5 µA and 10 µA to the temperature sensing diodes. The difference in the voltage $V_{D2}$ developed across the larger temperature sensing diodes and voltage $V_{D1}$ developed across the relatively smaller temperature sensing diodes, as described above with, for example, reference to FIGS. 1-3 is compared with a preprogramed target voltage 140.3 mV (corresponding to a temperature of 29° C.) in this example. The difference between $V_{D2}$ and $V_{D1}$ ($V_{D21}$) and the preprogramed target voltage is multiplied by −10000 and applied to heater 690 in this example. In other words, the voltage applied to the heater may be defined as:

$$V_{Heater} = -10000(V_{D2}-V_{D1}-0.1403)$$

Functionality of ring modulator 500 is first verified without ambient thermal noise. An RF probe is used to modulate the ring modulator. Optical probes are used for delivering continuous wave beam of laser 620 to input grating coupler 602 and from output grating coupler 604. A high-speed sequence controller controlling pattern generator 650 is used to supply a reverse bias of −3.5V and peak-to-peak modulation depth of 5.5V at 10 Gb/s and 20 Gb/s. The ring modulator 500 achieves up to 20 Gb/s of data rate with an extinction ratio of 4 dB in this example.

Without external temperature perturbations, the feedback loop sets the heater voltage such that ring modulator's temperature matches the target temperature of 29° C. or ($V_{D2}-V_{D1}$) voltage of 140.3 mV. The heater voltage associated with this setting is measured to be 2.8V in this example.

Figure 7A:
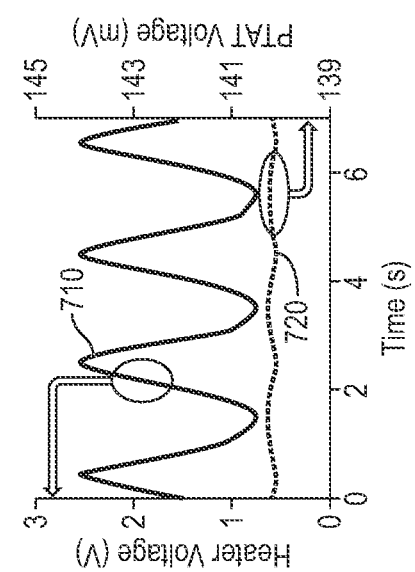
FIG. 7A shows the current of a peltier heater/cooler used in the measurement setup of FIG. 6.
Figure 7B:
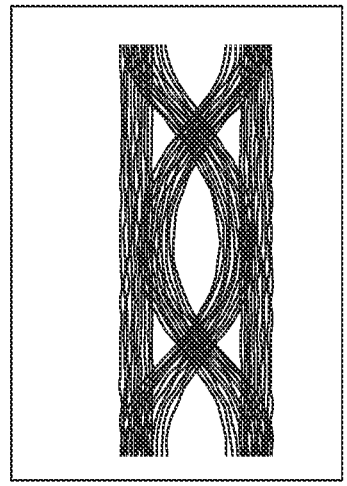
FIG. 7B shows the voltage applied to the heater integrated in the optical ring modulator of FIG. 4A, as well as the voltage of the loop.

FIG. 7A shows the current of peltier heater/cooler 690 used in the setup. Plot 710 of FIG. 7B shows the voltage applied to the heater integrated in ring modulator 500. Plot 720 of FIG. 7B shows voltage ($V_{D2}-V_{D1}$) of the feedback loop. The heater voltage, which is shown as changing from 0.74V to 2.48V, corresponds to 2.8 mW change in the heater's power, which according to FIGS. 5B and 5D corresponds to a change of 3.2° C. in the temperature of the ring modulator.

Due to the presence of PCB, the heat slowly diffuses from peltier heater/cooler 690 to the silicon photonic die that has integrated therein the optical ring modulator, heater, amplifier and other circuitry described above and shown in the Figures. The slow heat transfer from the PCB to the silicon photonic die provides a limits in showing the higher bandwidth of the feedback loop.

Figure 7C:
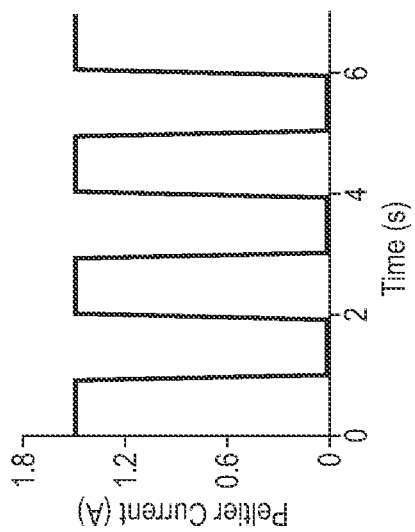
FIG. 7C shows the measured optical output eye diagram of the optical ring modulator of FIG. 4A in the presence of an emulated ambient temperature noise without temperature stabilization feedback loop.
Figure 7D:
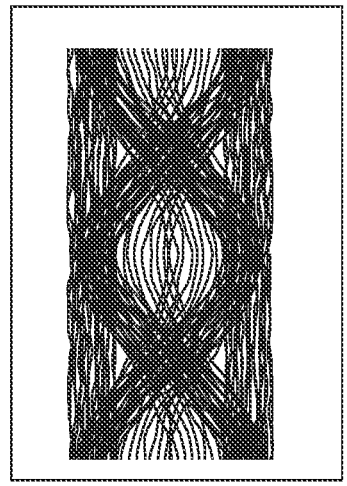
FIG. 7D shows the output optical eye diagram of the optical ring modulator of FIG. 4A when the feedback loop of the optical ring modulator is turned on, in accordance with embodiments of the present invention.

FIG. 7C shows the measured optical output eye diagram in the presence of an emulated ambient temperature noise without temperature stabilization feedback loop. FIG. 7D shows the output optical eye diagram when the feedback loop of the optical ring modulator is turned on, in accordance with the embodiments of the present invention.

In the experimental setup shown in FIG. 6, the feedback loop (see FIGS. 1-3) is controlled by GPIB controller 670 via a computer. However, a low-power ADC-based feedback or a programmable gain amplifier, as described above, may also be used to control the voltage applied to the heater, or the ring modulator, or both, via the feedback loop.

Furthermore, in the experimental setup shown in FIG. 6, the average heater power consumption is 1.3 mW. It is understood that the same heater may be used to overcome process variations inherent in forming the silicon photonic die.

The feedback loop may be used to set the temperature by ensuring that voltage ($V_{D2}-V_{D1}$) matches a pre-programed value. A one-time calibration may be used to set this value and adjust the resonance wavelength to the wavelength of interest. An FSR of 5 nm is also covered so as to ensure that the resonance wavelength may be set to a desired value. In the experimental setup shown in FIG. 6, 41 mW is required to cover the entire FSR, however, this amount may be significantly reduced by selective removal of the SOI substrate to increase the thermal impedance of the silicon photonic die.

The above embodiments of the present invention are illustrative and not limitative. Embodiments of the present invention are not limited by any specific frequency or wavelength of the optical signal. Embodiments of the present invention are not limited by the type of temperature sensor, diodes or otherwise, used to control the temperature of the optical ring modulator. Embodiments of the present invention are not limited by the number of temperature sensing diodes disposed along the periphery of the optical ring of the modulator. Other additions, subtractions or modifications are obvious in view of the present disclosure and are intended to fall within the scope of the appended claims.

What is claimed is:

1. An optical signal modulator comprising:
   a waveguide receiving an optical signal;
   an optical ring adapted to receive a portion of the optical signal via optical coupling;
   a first plurality of diodes coupled in parallel and disposed along an outer periphery of the optical ring, said plurality of diodes being separated from the optical ring by a distance, said first plurality of diodes generating a first electrical signal;
   a second plurality of diodes coupled in parallel and disposed along the outer periphery of the optical ring, said second plurality of diodes generating a second electrical signal;
   a doped region adapted to generate heat to the optical ring; and a control circuit adapted to control a temperature of the optical ring in accordance with the first and second electrical signals.

2. The optical signal modulator of claim 1 wherein each of said first plurality of diodes has a same junction area defined by a first number.

3. The optical signal modulator of claim 2 wherein each of said second plurality of diodes has a same junction area defined by a second number.

4. The optical signal modulator of claim 3 wherein each of at least a first subset of the first plurality of diodes is disposed between a different pair of the second plurality of diodes.

5. The optical signal modulator of claim 4 further comprising:
a first current source supplying a substantially constant first current to the first plurality of diodes to generate the first electrical signal; and
a second current source supplying a substantially constant second current to the second plurality of diodes to generate the second electrical signal.

6. The optical signal modulator of claim 5 wherein said control circuit comprises an amplifier adapted to control the temperature of the optical ring in accordance with the first and second electrical signals.

7. The optical signal modulator of claim 6 wherein in response to the first and second electrical signals, said amplifier applies a voltage to the doped region to vary the heat so as to maintain the temperature of the ring within a predefined range.

8. The optical signal modulator of claim 7 wherein in response to the first and electrical signals, said amplifier applies a DC voltage to the optical ring to maintain a substantially constant resonant wavelength in the optical ring.

9. The optical signal modulator of claim 7 wherein said optical signal modulator is integrated in a semiconductor substrate.

10. The optical signal modulator of claim 9 wherein said substrate is a silicon substrate.

11. A method of modulating an optical signal, the method comprising:
supplying an optical signal to a waveguide;
coupling a portion of the optical signal to an optical ring;
generating a first electrical signal via a first plurality of diodes coupled in parallel and disposed along an outer periphery of the optical ring, said plurality of diodes being separated from the optical ring by a distance;
generating a second electrical signal via a second plurality of diodes coupled in parallel and disposed along the outer periphery of the optical ring;
supplying heat to the optical ring via a doped region formed near a portion of the optical ring; and
controlling the temperature of the optical ring in accordance with the first and second electrical signals.

12. The method of claim 11 wherein each of said first plurality of diodes has a same junction area defined by a first number.

13. The method of claim 12 wherein each of said second plurality of diodes has a same junction area defined by a second number.

14. The method of claim 13 wherein each of at least a first subset of the first plurality of diodes is disposed between a different pair of the second plurality of diodes.

15. The method of claim 14 further comprising:
supplying a substantially constant first current to the first plurality of diodes to generate the first electrical signal; and
supplying a substantially constant second current to the second plurality of diodes to generate the second electrical signal.

16. The method of claim 15 further comprising:
amplifying a difference between the first and second electrical signals to generate an amplified signal.

17. The method of claim 16 further comprising:
controlling the heat supplied to the optical ring in accordance with the amplified signal.

18. The method of claim 16 further comprising:
controlling a DC voltage applied the optical ring in accordance with the amplified signal to maintain a substantially constant resonant wavelength in the optical ring.

19. The method of claim 17 wherein said waveguide, optical ring, doped region, first and second plurality of diodes, and first and second current sources supplying the first and second currents are integrated in a semiconductor substrate.

20. The method of claim 19 wherein said substrate is a silicon substrate.

* * * * *